United States Patent

Abe et al.

[11] Patent Number: 6,088,545
[45] Date of Patent: Jul. 11, 2000

[54] REAL-IMAGE TYPE VIEWFINDER

[75] Inventors: Tetsuya Abe; Takaaki Yano; Sachio Hasushita, all of Hokkaido, Japan

[73] Assignee: Asahi Kogaku Kogyo Kabushiki Kaisha, Tokyo, Japan

[21] Appl. No.: 09/034,357

[22] Filed: Mar. 4, 1998

[30] Foreign Application Priority Data

Mar. 5, 1997 [JP] Japan .................................. 9-067235

[51] Int. Cl.$^7$ ................................................ G03B 13/02
[52] U.S. Cl. ........................................ 396/373; 396/296
[58] Field of Search ................................ 396/296, 281, 396/373

[56] References Cited

U.S. PATENT DOCUMENTS

| | | | |
|---|---|---|---|
| 4,016,576 | 4/1977 | Nomura | 396/296 |
| 4,231,649 | 11/1980 | Kimura et al. | 396/281 |
| 4,560,264 | 12/1985 | Kitazawa et al. | |
| 5,218,396 | 6/1993 | Morisawa . | |
| 5,223,874 | 6/1993 | Kirigaya . | |
| 5,488,446 | 1/1996 | Kirigaya et al. | |
| 5,581,318 | 12/1996 | Shirator | 396/296 |
| 5,604,554 | 2/1997 | Kirigaya . | |

FOREIGN PATENT DOCUMENTS

| | | |
|---|---|---|
| 61-249034 | 11/1986 | Japan . |
| 1113736 | 5/1989 | Japan . |
| 2546330 | 10/1989 | Japan . |

*Primary Examiner*—Russell Adams
*Attorney, Agent, or Firm*—Greenblum & Bernstein, P.L.C.

[57] ABSTRACT

A viewfinder optical system for a real-image type viewfinder has a positive objective lens system for obtaining a finder-image, and an erecting optical system for converting the finder-image into an erected image. The erecting system includes a mirror for deflecting an optical axis of the objective lenses, and at least a part of the mirror is formed as a light-transmitting area. The viewfinder optical system further comprises an ocular lens for viewing the finder-image, and an optical system for optically producing an information pattern, such as a viewing-field-frame, to be superimposed on the finder-image. The projecting system includes a projecting lens which focuses and forms the frame-pattern on an image-forming plane, defined by the objective lens system, through the light-transmitting area of the mirror, so that the frame-pattern is superimposed on the finder-image.

48 Claims, 5 Drawing Sheets

REAL-IMAGE TYPE VIEWFINDER

BACKGROUND OF THE INVENTION

1. Field of the Invention

This invention relates to a real-image type viewfinder, used in a photographing camera, a video camera and so on, and, in particular, to a real-image type viewfinder for a camera, such as a lens-shutter type camera, which has a viewfinder optical system independent of a photographing optical system.

2. Description of the Related Art

In general, a viewfinder optical system for a real-image type viewfinder includes: a positive objective optical system for obtaining an inverted finder-image; an erecting optical system for converting the inverted finder-image into an erected finder-image; and an ocular optical system for viewing the erected finder-image therethrough.

As is well known, it is necessary to display various information patterns, such as a viewing-field-frame for defining a frame area to be photographed, a photometry-sensing-frame for defining a photometric area to be measured, suitable information symbols and so on, on a viewing field of the viewfinder. Namely, the various information patterns must be superimposed on the finder-image, observed through the ocular optical system of the viewfinder optical system.

Conventionally, in order to superimpose the information patterns on the finder image, a transparent glass plate, on which the information patterns are printed as opaque areas, is placed in the vicinity of a image-forming plane of the positive objective lens system of the viewfinder optical system. Thus, when viewing through the ocular optical system, the finder-image, together with information patterns superimposed thereon, can be observed, due to the transparent glass plate with the information patterns being located at the image-forming plane.

The locating of the transparent glass plate in the viewfinder optical system is relatively easy and inexpensive. Nevertheless, the method utilized is unadvisable, as dust, dirt and other types of particulate matter may be easily deposited on the transparent glass plate. Of course, the adhesion of dust and dirt to the transparent glass plate impairs the visual clarity.

Unexamined Japanese Patent Publication No. 1-113736 discloses another approach for superimposing the information patterns on the finder-image. According to this approach, an optical information-pattern-projecting system is incorporated into the viewfinder optical system, and includes a half mirror interposed between the erecting optical system and the ocular optical system, and a translucent plate, such as a frosted glass plate, having the information patterns printed as transparent-area segments thereon.

The translucent plate is positioned at a location that is the optical equivalent of the location of the image-forming plane of the positive objective optical system with respect to the ocular optical system. The translucent plate is illuminated with natural or external light, in such a manner that light rays, passing through the translucent plate, are directed to the ocular optical system through the half mirror. Thus, when viewing through the ocular optical system, the finder-image, obtained through the objective optical system, can be observed, together with the information patterns, superimposed thereon, which are obtained through the translucent plate.

As mentioned above, the information patterns are printed as transparent-area segments on the translucent plate. Therefore, providing particulate matter is only adhered to the translucent area of the translucent plate, the visual clarity of the ocular optical system is not impaired.

Nevertheless, the approach, disclosed in the above-mentioned publication, has some disadvantages as follows:

Firstly, a focal length of the ocular optical system is increased, due to the existence of the half mirror interposed between the erecting optical system and the ocular optical system, resulting in lowering a magnification of the viewfinder optical system. Thus, in order to compensate for the lowered magnification, a size of the viewfinder optical system must be increased.

Secondly, when the concept of the previously-mentioned publication is applied to an existing camera, a basic design for a viewfinder optical system of the existing camera must be modified, due to the fact that the half mirror must be interposed between the erecting optical system and the ocular optical system. Of course, a modification to the basic design of the viewfinder optical system is very costly.

SUMMARY OF THE INVENTION

Therefore, an object of the present invention is to provide a real-image type viewfinder, used in photographing camera, a video camera and so on, which is constituted such that the above-mentioned disadvantages can be surmounted.

In accordance with the present invention, there is provided a real-image type viewfinder of a camera having a viewfinder optical system independent from a photographing optical system of the camera.

According to an aspect of the present invention, the viewfinder optical system comprises: a positive objective optical system for obtaining an inverted finder-image; an erecting optical system for converting the inverted finder-image into an erected finder-image, the erecting optical system including a reflective mirror element for deflecting an optical axis of the positive objective optical system, at least a part of the reflective mirror element being formed as a light-transmitting area; an ocular optical system for viewing the erected finder-image; and an optical information-pattern-projecting system for optically producing an information pattern to be superimposed on the erected finder-image, wherein the optical information-pattern-projecting system includes a projecting optical system which focuses and forms the information pattern on an image-forming plane, defined by the positive objective optical system, through the light-transmitting area of the reflective mirror element, so that the information pattern is superimposed on the erected finder-image.

The reflective mirror element may comprise a roof mirror for converting the inverted finder-image into the erected finder-image, and the light-transmitting area is formed as a through hole in the roof mirror. Preferably, the erecting optical system further includes an optical prism system optically associated with the roof mirror.

Optionally, the erecting optical system includes an optical prism system, which operates in conjunction with the reflective mirror element, thereby performing the conversion of the inverted finder-image into the erected finder-image. In this case, the reflective mirror element may comprise a half mirror. Also, the reflective mirror element may comprise an optical reflector, and the light-transmitting area may be formed as a localized half mirror area. Further, the reflective mirror element may comprise an optical reflector, and the light-transmitting area may be formed as a through hole.

According to another aspect of the present invention, the viewfinder optical system comprises: a positive objective optical system for focusing and forming a finder-image on an image-forming plane thereof; an ocular optical system for viewing the finder-image formed on the image-forming plane of the positive objective optical system; a deflection optical system having a plurality of optical reflective surfaces for deflecting an optical axis of the positive objective optical system, the deflection optical system being provided between the positive objective optical system and the ocular optical system; and an optical information-pattern-projecting system for optically producing an information pattern to be superimposed on the finder-image, wherein one of the optical reflective surfaces of the deflection optical system is provided by a reflective mirror element, which is optically associated with the positive objective optical system, such that the image-forming plane of the positive objective optical system is positioned at a given location, at least a part of the reflective mirror element being formed as a light-transmitting area, and wherein the optical information-pattern-projecting system includes a projecting lens system for focusing and forming the information pattern on the image-forming plane of the positive objective optical system through the light-transmitting area of the reflective mirror element.

The reflective mirror element may comprise a roof mirror for converting the finder-image, formed by the positive objective optical system, into an erected finder-image, and the light-transmitting area is formed as a through hole in the roof mirror. Preferably, the remaining reflective surfaces of the deflection optical system are provided by an optical prism system, which is optically associated with the roof mirror.

Optionally, the remaining reflective surfaces of the deflection optical system are provided by an optical prism system, which operates in conjunction with the reflective mirror element, thereby converting the finder-image, formed by the positive objective optical system, into an erected finder-image. In this case, the reflective mirror element may comprise a half mirror. Also, the reflective mirror element may comprise an optical reflector, and the light-transmitting area may be formed as a localized half mirror area. Further, the reflective mirror element may comprise an optical reflector, and the light-transmitting area may be formed as a through hole.

According to the present invention, preferably, the projecting optical system of the optical information-pattern-projecting system has a magnification of at least 1.0.

The optical information-pattern-projecting system includes a mask element, in which the information pattern is defined as an open area, and the mask element may be manufactured from either an opaque plate or a translucent plate. Also, the optical information-pattern-projecting system may include an optical diffusion plate, through which the mask element is illuminated by either an internal light source or external light. When the mask element is illuminated by the external light, the optical diffusion plate may be disposed in either a front side or a top side of a camera body to define a window for introducing the external light into the optical information-pattern-projecting system.

Preferably, the mask element of the optical information-pattern-projecting system produces at least a pattern of a viewing-field-frame for defining a frame area to be photographed, and a pattern of a photometry-sensing-frame for defining a photometric area to be measured. Another mask element may be disposed adjacent to the image-forming plane defined by the positive objective optical system, to produce a pattern of a viewing-field-frame for defining a frame area to be photographed. In this case, the mask element of the optical information-pattern-projecting system may be utilized to produce at least a pattern of a photometry-sensing-frame for defining a photometric area to be measured.

According to the present invention, the optical information-pattern-projecting system may include a liquid crystal display panel, in which the information pattern is defined as a light-transmitting-area. In this case, preferably, the optical information-pattern-projecting system includes an optical diffusion plate, through which the liquid crystal display panel is illuminated by either an internal light source or external light. Similar to the above-mentioned case, the optical diffusion plate may be disposed in either a front side or a top side of a camera body to define a window for introducing the external light into the optical information-pattern-projecting system.

Preferably, the liquid crystal display panel of the optical information-pattern-projecting system produces at least a pattern of a viewing-field-frame for defining a frame area to be photographed, and a pattern of a photometry-sensing-frame for defining a photometric area to be measured. When the optical information-pattern-projecting system may include a liquid crystal display panel, a mask element may be disposed adjacent to the image-forming plane defined by the positive objective optical system, to produce a pattern of a viewing-field-frame for defining a frame area to be photographed. In this case, the liquid crystal display panel of the optical information-pattern-projecting system may be utilized to produce at least a pattern of a photometry-sensing-frame for defining a photometric area to be measured.

BRIEF DESCRIPTION OF THE DRAWINGS

These objects and other objects of the present invention will be better understood from the following description, with reference to the accompanying drawings, in which.

DESCRIPTION OF THE PREFERRED EMBODIMENTS

Figure 1:
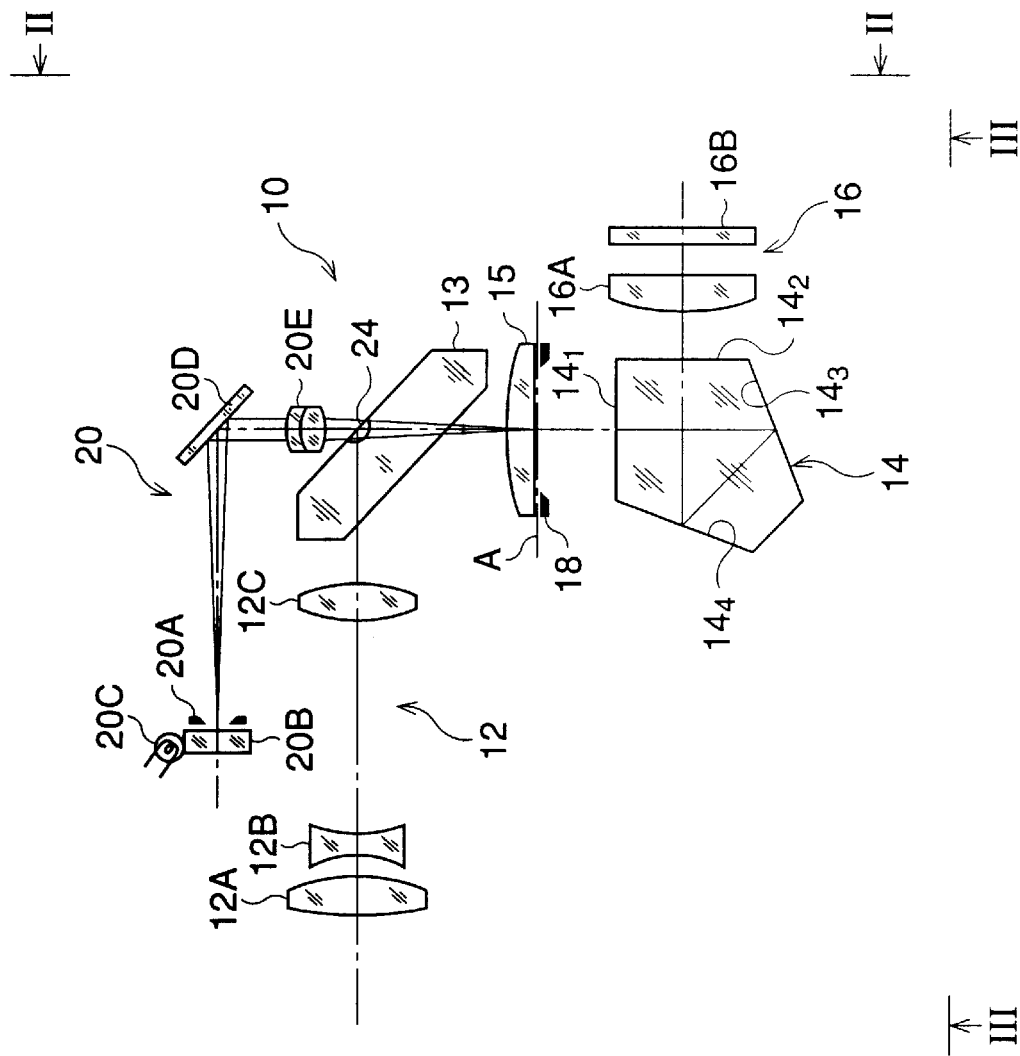
FIG. 1 is a plan view showing an arrangement of a viewfinder optical system of a first embodiment of a real-image type viewfinder, according to the present invention.
Figure 2:
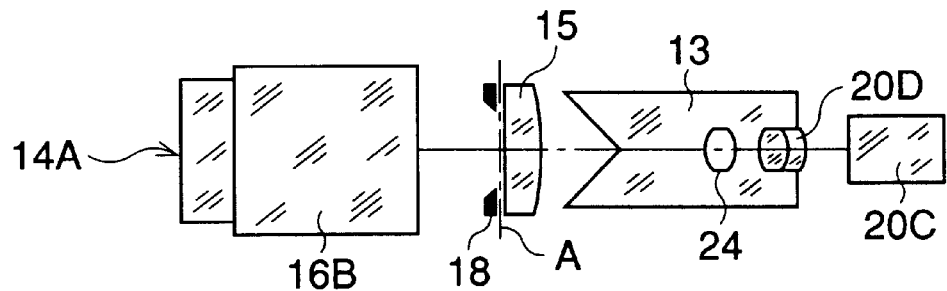
FIG. 2 is a rear side view of FIG. 1, observed from line II—II of FIG. 1.
Figure 3:
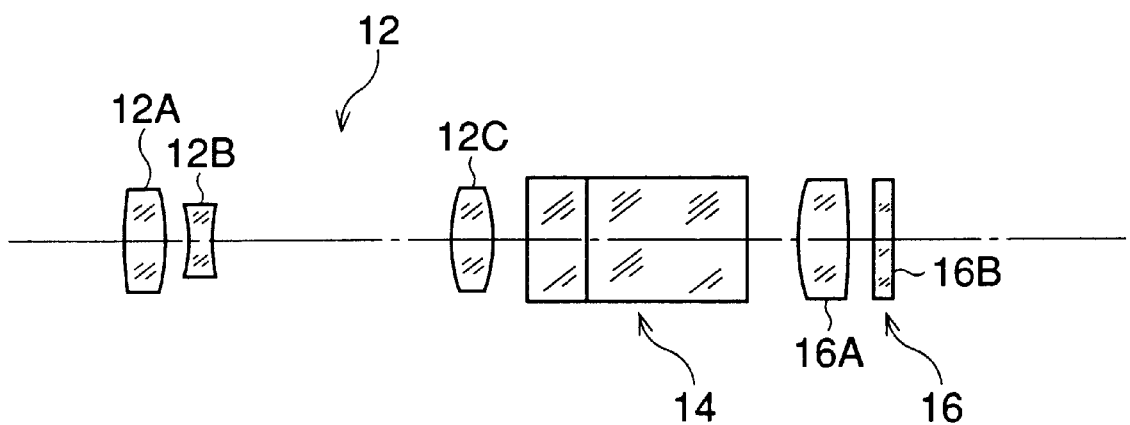
FIG. 3 is a side view of FIG. 1, observed from line III—III of FIG. 1.

FIGS. 1, 2 and 3 show a first embodiment of a real-image type viewfinder according to the present invention. The real-image type viewfinder comprises a viewfinder optical system, generally indicated by reference 10, which includes an objective optical system 12, an erecting optical system composed of a roof mirror 13 and a pentagonal prism 14, a field lens 15, and an ocular optical system 16.

The objective optical system 12 has a positive objective lens 12A, a negative lens 12B positioned beside the positive objective lens 12A at the rear side thereof, and a positive lens 12C spaced to the rear of the negative lens 12B. The roof mirror 13, forming a part of the erecting optical system (13, 14), is spaced to the rear of the positive lens 12C to perpendicularly bend an optical axis of the positive objective optical system 12. Namely, when light rays carrying a finder-image, which pass through the objective optical system 12, become incident on the roof mirror 13, the light rays carrying the finder image, as is well known, are reflected twice by the roof mirror 13, thereby being perpendicularly deflected to become incident on the field lens 15.

The objective optical system 12 per se serves as a positive objective optical system, and defines an image-forming plane, indicated by reference A, on which the finder-image is focused and formed. The field lens 15 is positioned in the vicinity of the image-forming plane A.

Although the finder-image is obtained as an inverted image by the positive objective optical system 12, the finder-image is focused and formed as an erected image on the image-forming plane A, due to the existence of the roof mirror 13 operating in conjunction with the pentagonal prism 14 to create the erecting optical system (13, 14).

The pentagonal prism 14 has a light-entrance surface $14_1$, a light-emitting surface $14_2$, a first reflective surface $14_3$ and a second reflective surface $14_4$. The light-entrance surface $14_1$ and the light-emitting surface $14_2$ are perpendicular to each other, and the first and second reflective surfaces $14_3$ and $14_4$ define an angle of 45° with respect to each other.

The ocular optical system 16 comprises an eyepiece 16A and an associated protective glass plate element 16B. The glass plate element 16B is assembled in an opening formed in a camera body, thereby defining a window for the viewfinder. As is apparent from FIGS. 1 and 2, the light-entrance surface $14_1$ faces the field lens 15, and the light-emitting surface $14_2$ faces the eyepiece 16A of the ocular optical system 16.

With this arrangement, the light rays carrying the finder-image, which are incident on the light-entrance surface $14_1$, are reflected by the first reflective surface $14_3$; are then reflected by the second reflective surface $14_4$; and are thus emitted from the light-emitting surface $14_2$, whereby the light rays carrying the finder-image are directed to the ocular optical system 16. Thus, the finder-image, focused and formed on the image-forming plane A by the objective optical system 12, can be observed through the ocular optical system 16.

In the first embodiment as shown in FIGS. 1 to 3, a mask element 18 is positioned adjacent to the image-forming plane A, to produce a viewing-field-frame for defining a frame area to be photographed. The mask element 18 may be manufactured from a suitable opaque plate or translucent plate, such as a frosted glass plate, and the pattern of the viewing-field-frame is defined as an open area formed in the opaque plate or translucent plate. Thus, the pattern of the viewing-field-frame is displayed on a viewing field of the viewfinder. Namely, when being viewed through the ocular optical system 16, the finder-image, having the viewing-field-frame superimposed thereon, can be observed, due to the mask element 18 being located at the image-forming plane A.

As mentioned above, the pattern of the viewing-field-frame is defined as the open area formed in the mask element 18. Therefore, particulate matter is only adhered to the opaque or translucent area of the mask element 18, and thus the visual clarity of the ocular optical system is not impaired.

The viewfinder optical system 10 further includes an optical information-pattern-projecting system 20, which has a mask element 20A, a diffusion plate 20B, an internal light source or electrical lamp 20C, a reflective mirror 20D and a projecting lens 20E. As is apparent from FIG. 1, the mask element 20A is placed beside the diffusion plate 20B at a rear side thereof, and the optical diffusion plane 20B is associated with the internal light source 20C, such that the mask element 20A is illuminated with light rays emitted from the light source 20C and scattered by the diffusion plate 20B. The reflective mirror 20D is spaced to the rear of the mask element 20A to perpendicularly deflect light rays, passing through the mask element 20A, such that the deflected light rays are directed to the projecting lens 20E.

The mask element 20A is used to produce a photometry-sensing-frame for defining a photometric area to be measured, suitable information symbols and so on. Similar to the case of the mask element 18, the mask element 20A may be manufactured from a suitable opaque plate or translucent plate, such as a frosted glass plate. The photometry-sensing-frame, the information symbols and so on are defined by an open area formed in the opaque plate or translucent plate.

As shown in FIGS. 1 and 2, the roof mirror 13 has a through hole 24 formed at a center thereof, the projecting lens 20E serves to focus and form the patterns of the photometry-sensing-frame, the information symbols and so on, on the image-forming plane A, through the through hole 24 of the roof mirror 13.

Accordingly, similar to the case of the viewing-field-frame of the mask element 18, the photometry-sensing-frame, the information symbols and so on are also displayed on the viewing field of the viewfinder. Namely, when being viewed through the ocular optical system 16, the patterns of the photometry-sensing-frame, the information symbols and so on, superimposed on the finder-image, can be observed due to these patterns being formed on the image-forming plane A. Also, since the patterns of the photometry-sensing-frame, the information symbols and so on are defined as the open areas formed in the mask element 20A, as mentioned above, particulate matter is only adhered to the opaque or translucent area of the mask element 20A, and thus the visual clarity of the ocular optical system is not impaired.

For the purpose of producing the patterns of the photometry-sensing-frame, the information symbols and so on, an LCD (Liquid Crystal Display) panel may be substituted for the mask element 20A. In this case, the patterns of the photometry-sensing frame, the information symbols and so on are defined as light-transmitting-area segments produced on the LCD panel. Accordingly, particulate matter, only adhered to the opaque or translucent area of the LCD panel, will not impair the visual clarity of the ocular optical system.

In the first embodiment as mentioned above, although the mask element 20A is illuminated with the light rays emitted from the internal light source 20C and scattered by the optical diffusion plate 20B, the internal light source 20C may be omitted from the viewfinder optical system 10. In this case, instead of the internal light source 20C, a window for introducing natural or external light into the optical information-pattern-projecting system 20 is formed in a camera body, thereby illuminating the diffusion plate 20B with the introduced light.

Further, in the first embodiment as mentioned above, the projecting lens 20E may have a magnification of more than 1.0. In this case, it is possible to reduce a size of the mask element 20A, thereby contributing to the miniaturization of a camera.

Figure 4:
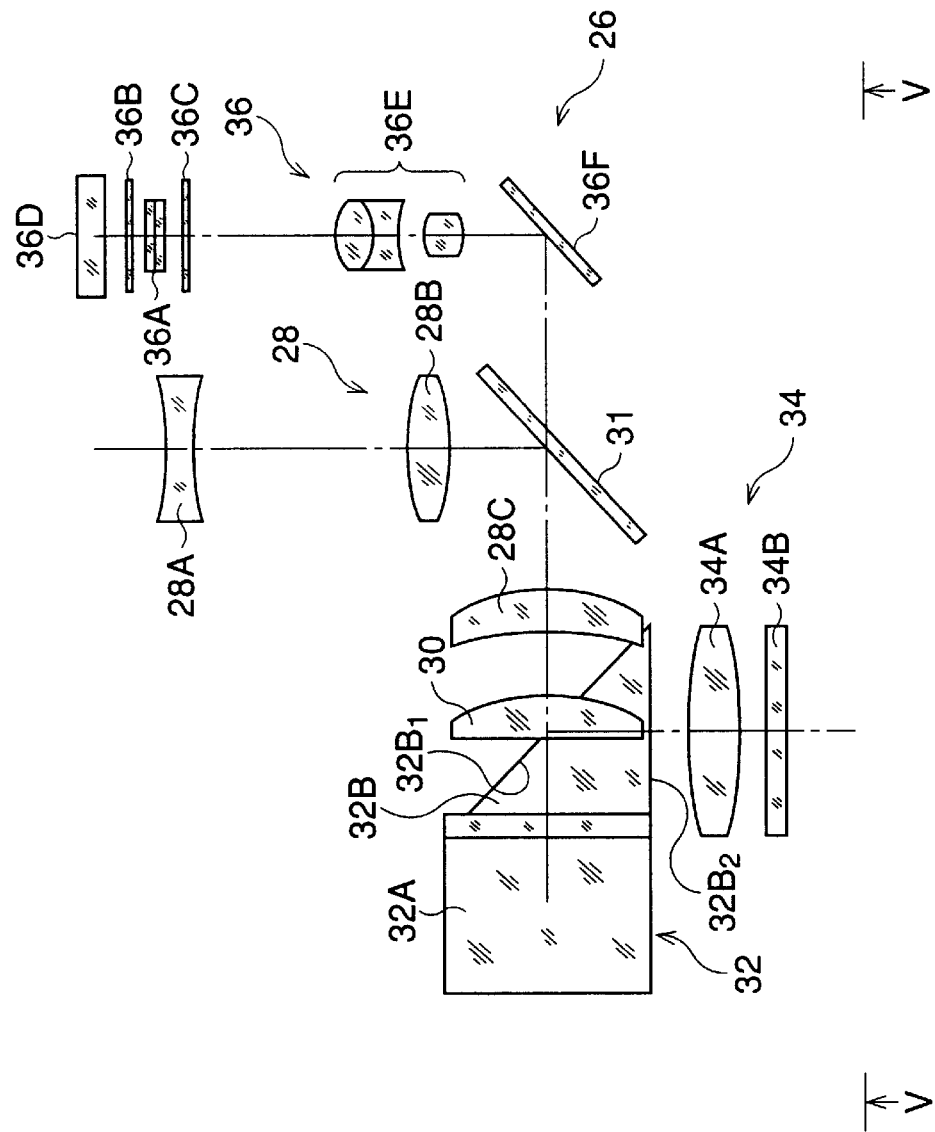
FIG. 4 is a plan view showing an arrangement of a viewfinder optical system of a second embodiment of a real-image type viewfinder according to the present invention.
Figure 5:
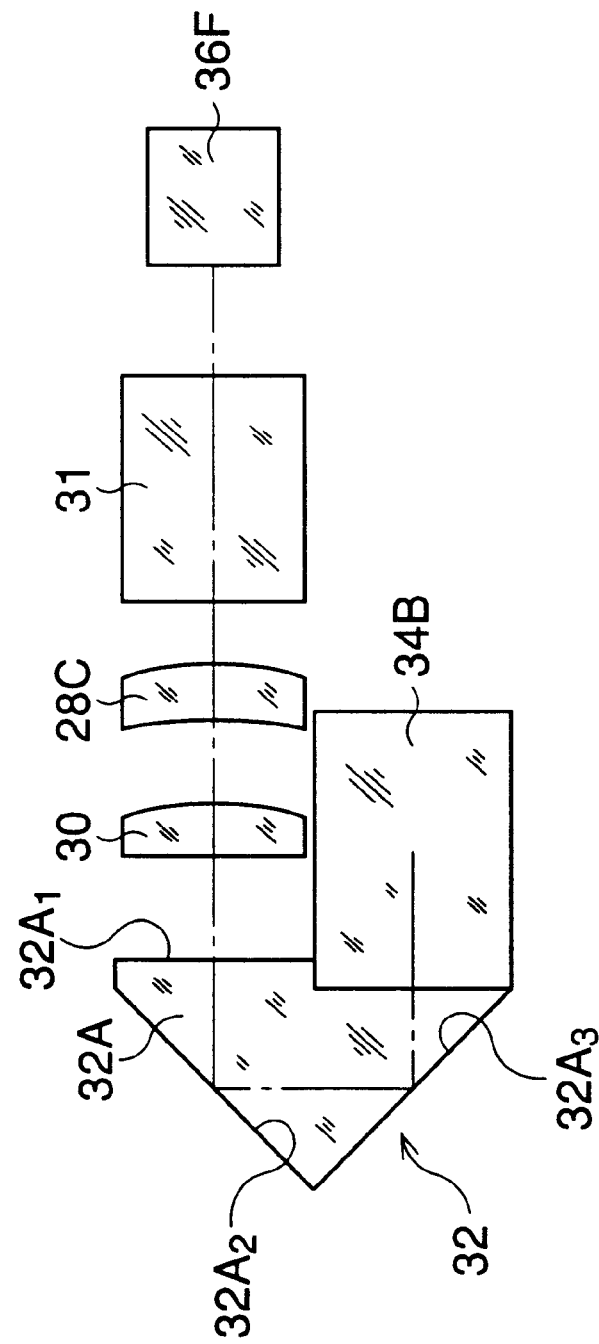
FIG. 5 is a rear side view of FIG. 4, observed from line V—V of FIG. 4.

FIGS. 4 and 5 show a second embodiment of a real-image type viewfinder, according to the present invention. The real-image type viewfinder comprises a viewfinder optical system, generally indicated by reference 26, which includes an objective optical system 28, a field lens 30, an erecting optical system composed of a half mirror 31 and a prism assembly 32, and an ocular optical system 34.

The objective optical system 28 has a negative objective lens 28A, and a positive lens 28B spaced to the rear of the negative objective lens 28A. The half mirror 31, forming a part of the erecting optical system, is spaced to the rear of the positive lens 28B to perpendicularly bend an optical axis of the objective optical system 28. The objective optical system further includes a positive lens 28C coaxial with the optical axis bent by the half mirror 31.

The objective optical system 28 per se serves as a positive objective optical system, defining an image-forming plane. Accordingly, light rays carrying a finder-image, which pass through the objective optical system 28, are focused on the image-forming plane defined by the objective optical system 28, thus forming the finder-image on the image-forming plane. Similar to the field lens 15 of the first embodiment, the field lens 30 is positioned in the vicinity of the image-forming plane.

The prism assembly 32, operating in conjunction with the half mirror 31 to create the erecting optical system (31, 32), includes a first prism element 32A and a second prism element 32B, each of which is shaped as a right-angled triangular prism. As shown in FIG. 5, the first prism element 32A has a light-entrance surface $32A_1$ perpendicularly arranged with respect to the deflected optical axis of the objective optical system 28, a first reflective surface $32A_2$ defining an angle of 45° with respect to the light-entrance surface $32A_1$, and a second reflective surface $32A_3$ defining an angle of 90° with respect to the first reflective surface $32A_2$. As shown in FIG. 4, the second prism element 32B has a reflective surface $32B_1$ defining an angle of 45° with respect to the light-entrance surface $32A_1$ of the first prism element 32A, and a light-emitting surface $32B_2$ defining an angle of 45° with respect to the reflective surface $32B_1$.

As is apparent from FIGS. 4 and 5, the first and second prism elements 32A and 32B are combined with each other, such that a surface of the first prism element 32A is in contact with a surface of the second prism element 32B, defining an angle of 45° with respect to the reflective surface $32B_1$ and an angle of 90° with respect to the light-emitting surface $32B_2$.

The ocular optical system 34 comprises an eyepiece 34A and an associated protective glass plate element 34B. Similar to the case of the first embodiment, the glass plate element 34B is assembled in an opening formed in a camera body, thereby defining a window for the viewfinder. As is apparent from FIGS. 4 and 5, the light-entrance surface $32A_1$ of the first prism element 32A faces the field lens 30, and the light-emitting surface $32B_2$ of the second prism element 32B faces the eyepiece 34A of the ocular optical system 34.

With this arrangement, the light rays carrying the finder-image, which are incident on the light-entrance surface $32A_1$ of the first prism element 32A, are reflected by the first reflective surface $32A_2$, are then reflected by the second reflective surface $32A_3$, are further reflected by the reflective surface $32B_1$ of the second prism element 32B, and are thus emitted from the light-emitting surface $32B_2$, whereby the light rays carrying the finder-image are directed to the ocular optical system 34. Although the finder-image is obtained as an inverted image by the positive objective lens system 28, the finder-image can be viewed as an erected image through the ocular optical system 34, due to the existence of the erecting optical system (31, 32).

The viewfinder optical system 26 further includes an optical information-pattern-projecting system 36, which has an LCD (Liquid Crystal Display) panel 36A, two polarizing plates 36B and 36C positioned at opposite sides of the LCD panel 36A, and an optical diffusion plate 36D, such as a frosted glass plate, positioned at a front side of the polarizing plate 36B. The optical information-pattern-projecting system 36 further has a projecting lens system 36E spaced to the rear of the polarizing plate 36C, and a reflective mirror 36F subsequent to the projecting lens system 36E. By the reflective mirror 36F, an optical axis of the optical information-pattern-projecting system 36 is perpendicularly deflected so as to be directed to the half mirror 31 of the objective optical system 28, such that the optical axis, deflected by the reflective mirror 36F, is coincident with the optical axis of the objective optical system 28, deflected by the half mirror 31.

The LCD panel 36A serves to produce information patterns, such as a viewing-field-frame for defining a frame area to be photographed, a photometry-sensing-frame for defining a photometric area to be measured, suitable information symbols and so on, to be displayed on a viewing field of the viewfinder. The information patterns are defined as light-transmitting-area segments produced on the LCD panel 36A.

The optical diffusion plate 36D is assembled in an opening formed in the camera body, thereby defining a window for introducing natural or external light into the optical information-pattern-projecting system 36. Namely, the optical diffusion plate is illuminated with the natural or external light. Nevertheless, the diffusion plate 36D may be illuminated by an internal light source, similar to the case of the first embodiment.

Light rays, which pass through the LCD panel 36, carry the information patterns, i.e the viewing-field-frame, the photometry-sensing-frame, the suitable information symbols and so on. The projecting lens system 36E serves to focus the light rays carrying the information patterns on the image-forming plane, defined by the objective optical system 28, through the reflective mirror 36F and the half mirror 31, thus forming the information patterns on the image-forming plane of the objective optical system 28.

Accordingly, the information patterns, i.e. the patterns of viewing-field-frame, the photometry-sensing-frame, the suitable information symbols and so on, are displayed on the viewing field of the viewfinder. Namely, when being viewed through the ocular optical system 34, the patterns of the viewing-field-frame, the photometry-sensing-frame, the information symbols and so on, superimposed on the finder-image, can be observed due to theses patterns being formed on the image-forming plane of the objective optical system 28.

As mentioned above, since the patterns of the viewing-field-frame, the photometry-sensing-frame, the information symbols and so on are defined as the light-transmitting areas of the LCD panel 36A, although particulate matter may be adhered to the opaque display area of the LCD panel 36A (excluding the light-transmitting-area segments forming the information patterns), the particulate matter cannot be viewed through the ocular optical system 34, and thus the visual clarity of the ocular optical system 34 is not impaired.

Figure 6:
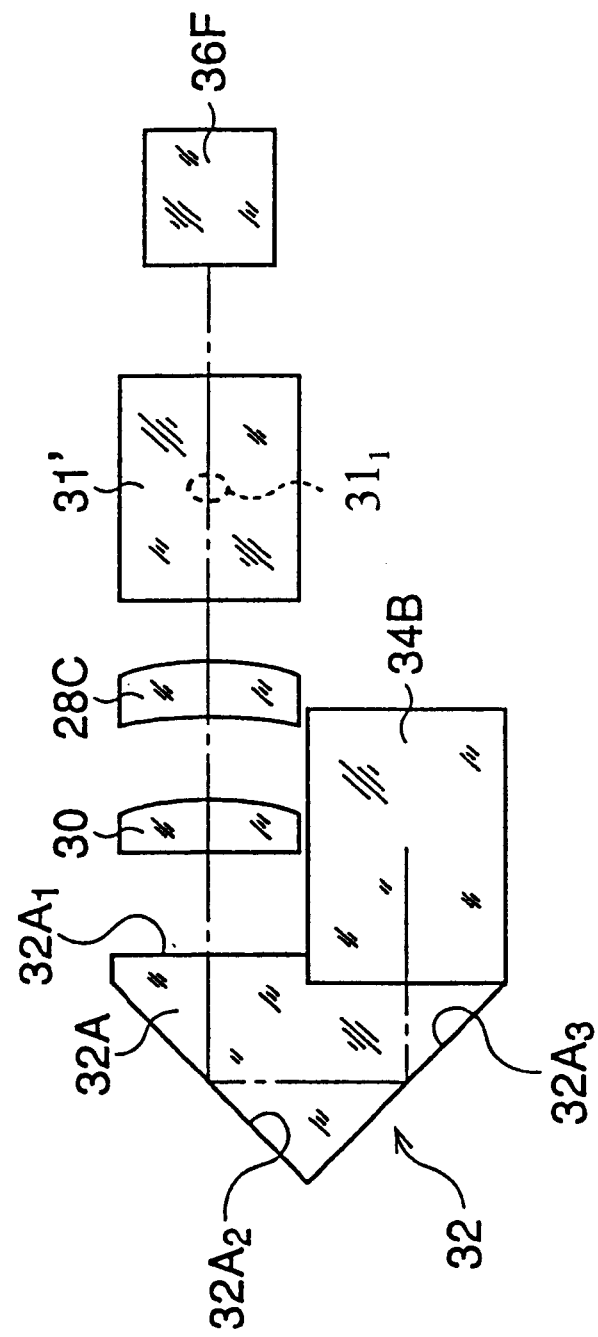
FIG. 6 is a rear side view, similar to FIG. 5, showing a modification of the second embodiment shown in FIGS. 4 and 5.

FIG. 6 shows a modification of the second embodiment as shown in FIGS. 4 and 5. In this modification, an optical reflector or reflective mirror 31' is substituted for the half mirror 31, and has a localized half mirror area 31₁' formed at a center thereof. The light rays, derived from the optical information-pattern-projecting system 36, are focused on the image-forming plane of the objective optical system 28, through the half mirror area 31₁' of the reflective mirror 31'. In place of the half mirror area 31₁', the reflective mirror 31' may have a through hole formed at a center thereof.

Similar to the case of the first embodiment, the viewing-field-frame, having the largest relative size of the information patterns to be displayed, may be defined by a mask element, positioned in the vicinity of the image-forming plane defined by the objective optical system 28, being manufactured from a suitable opaque plate or translucent plate, such as a frosted glass plate. In this case, the viewing-field-frame is omitted from the information pattern to be produced by the LCD panel 36A.

Further, when the mask element for producing the viewing-field-frame is utilized, a further mask element may be substituted for the LCD panel 36A, for the purpose of producing the photometry-sensing-frame, the information symbols and so on. The patterns of the photometry-sensing-frame, the information symbols and so on are then defined as open areas formed in the further mask element. Accordingly, particulate matter is only adhered to the opaque or translucent area of the further mask element, and thus the visual clarity of the ocular optical system 34 is not impaired.

In this second embodiment, preferably, the light-introduction window, which is defined by the diffusion plate 36D, is provided in a front side of the camera body, because the optical information-pattern-projecting system 36 is arranged such that the optical axis, defined by the elements 36A, 36B, 36C, 36D and 36E, is in parallel with the optical axis of the objective optical system 28, defined by the negative objective lens 28A and the positive lens 28B.

Nevertheless, the light-introduction window may be provided in a top side of the camera body, if necessary. In this case, the diffusion plate 36D is assembled in the top side of the camera to define the light-introduction window, and the optical information-pattern-projecting system 36 is arranged such that the optical axis, defined by the elements 36A, 36B, 36C, 36D and 36E, is perpendicular to the optical axis of the objective optical system 28.

Similar to the case of the first embodiment, the projecting lens system 36E may have a magnification of more than 1.0. In this case, a size of the LCD panel 36A can be reduced, thereby contributing to the miniaturization of a camera.

As is apparent from the foregoing, it is possible to apply the present invention to an existing camera without modifying a basic design for a viewfinder optical system of the existing camera, i.e. a basic arrangement including a positive objective optical system (12; 28), an erecting optical system (13, 14; 31, 32) and an ocular optical system (16; 34), because any one of the elements of an optical information-pattern-projecting system (20; 36) is not interposed into the basic arrangement of the viewfinder optical system.

Finally, it will be understood by those skilled in the art that the foregoing description is of preferred embodiments of the device, and that various changes and modifications may be made to the present invention without departing from the spirit and scope thereof.

The present disclosure relates to subject matter contained in Japanese Patent Application No. 9-067235 (filed on Mar. 5, 1997) which is expressly incorporated herein, by reference, in its entirety.

We claim:

1. A real-image type viewfinder of a camera having a viewfinder optical system independent from a photographing optical system of said camera, said viewfinder optical system comprising:
    a positive objective optical system for obtaining an inverted finder-image;
    an erecting optical system for converting the inverted finder-image into an erected finder-image, said erecting optical system including a reflective mirror element for deflecting an optical axis of said positive objective optical system, at least a part of said reflective mirror element being formed as a light-transmitting area;
    an ocular optical system for viewing the erected finder-image; and
    an optical information-pattern-projecting system for optically producing an information pattern to be superimposed on the erected finder-image,
    wherein said optical information-pattern-projecting system includes a projecting optical system which focuses and forms the information pattern on an image-forming plane, defined by said positive objective optical system, through the light-transmitting area of said reflective mirror element, so that the information pattern is superimposed on the erected finder-image.

2. A real-image type viewfinder as set forth in claim 1, wherein said reflective mirror element comprises a roof mirror for converting the inverted finder-image into the erected finder-image, and said light-transmitting area is formed as a through hole in said roof mirror.

3. A real-image type viewfinder as set forth in claim 2, wherein said erecting optical system further includes an optical prism system optically associated with said roof mirror.

4. A real-image type viewfinder as set forth in claim 1, wherein said erecting optical system further includes an optical prism system which operates in conjunction with said reflective mirror element, thereby performing the conversion of the inverted finder-image into the erected finder-image.

5. A real-image type viewfinder as set forth in claim 4, wherein said reflective mirror element comprises a half mirror.

6. A real-image type viewfinder as set forth in claim 4, wherein said reflective mirror element comprises an optical reflector, and said light-transmitting area is formed as a localized half mirror area.

7. A real-image type viewfinder as set forth in claim 4, wherein said reflective mirror element comprises an optical reflector, and said light-transmitting area is formed as a through hole.

8. A real-image type viewfinder as set forth in claim 1, wherein the projecting optical system of said optical information-pattern-projecting system has a magnification of at least 1.0.

9. A real-image type viewfinder as set forth in claim 1, wherein said optical information-pattern-projecting system includes a mask element, in which the information pattern is defined as an open area.

10. A real-image type viewfinder as set forth in claim 9, wherein said mask element is manufactured from an opaque plate.

11. A real-image type viewfinder as set forth in claim 9, wherein said mask element is manufactured from a translucent plate.

12. A real-image type viewfinder as set forth in claim 9, wherein said optical information-pattern-projecting system includes an optical diffusion plate, through which said mask element is illuminated by an internal light source.

13. A real-image type viewfinder as set forth in claim 9, wherein said optical information-pattern-projecting system includes an optical diffusion plate, through which said mask element is illuminated by external light.

14. A real-image type viewfinder as set forth in claim 13, wherein said optical diffusion plate is disposed in a front side of a camera body to define a window for introducing the external light into said optical information-pattern-projecting system.

15. A real-image type viewfinder as set forth in claim 13, wherein said optical diffusion plate is disposed in a top side of a camera body to define a window for introducing the external light into said optical information-pattern-projecting system.

16. A real-image type viewfinder as set forth in claim 9, wherein the mask element of said optical information-pattern-projecting system produces at least a pattern of a viewing-field-frame for defining a frame area to be photographed, and a pattern of a photometry-sensing-frame for defining a photometric area to be measured.

17. A real-image type viewfinder as set forth in claim 9, wherein another mask element, disposed adjacent to the image-forming plane defined by said positive objective optical system, produces a pattern of a viewing-field-frame for defining a frame area to be photographed, and the mask element of said optical information-pattern-projecting system produces at least a pattern of a photometry-sensing-frame for defining a photometric area to be measured.

18. A real-image type viewfinder as set forth in claim 1, wherein said optical information-pattern-projecting system includes a liquid crystal display panel, in which the information pattern is defined as a light-transmitting-area.

19. A real-image type viewfinder as set forth in claim 18, wherein said optical information-pattern-projecting system includes an optical diffusion plate, through which said liquid crystal display panel is illuminated by an internal light source.

20. A real-image type viewfinder as set forth in claim 18, wherein said optical information-pattern-projecting system has an optical diffusion plate, through which said liquid crystal display panel is illuminated by external light.

21. A real-image type viewfinder as set forth in claim 20, wherein said optical diffusion plate is disposed in a front side of a camera body to define a window for introducing the external light into said optical information-pattern-projecting system.

22. A real-image type viewfinder as set forth in claim 20, wherein said optical diffusion plate is disposed in a top side of a camera body to define a window for introducing the external light into said optical information-pattern-projecting system.

23. A real-image type viewfinder as set forth in claim 18, wherein the liquid crystal display panel of said optical information-pattern-projecting system produces at least a pattern of a viewing-field-frame for defining a frame area to be photographed, and a pattern of a photometry-sensing-frame for defining a photometric area to be measured.

24. A real-image type viewfinder as set forth in claim 18, wherein a mask element, disposed adjacent to the image-forming plane defined by said positive objective optical system, produces a pattern of a viewing-field-frame for defining a frame area to be photographed, and the liquid crystal display panel of said optical information-pattern-projecting system produces at least a pattern of a photometry-sensing-frame for defining a photometric area to be measured.

25. A real-image type viewfinder of a camera having a viewfinder optical system independent from a photographing optical system of said camera, said viewfinder optical system comprising:

a positive objective optical system for focusing and forming a finder-image on an image-forming plane thereof;

an ocular optical system for viewing the finder-image formed on the image-forming plane of said positive objective optical system;

a deflection optical system having a plurality of optical reflective surfaces for deflecting an optical axis of said positive objective optical system, said deflection optical system being provided between said positive objective optical system and said ocular optical system; and an optical information-pattern-projecting system for optically producing an information pattern to be superimposed on the finder-image, wherein one of the optical reflective surfaces of said deflection optical system is provided by a reflective mirror element, which is optically associated with said positive objective optical system such that the image-forming plane of said positive objective optical system is positioned at a given location, at least a part of said reflective mirror element being formed as a light-transmitting area, and wherein said optical information-pattern-projecting system includes a projecting lens system for focusing and forming the information pattern on the image-forming plane of said positive objective optical system through the light-transmitting area of said reflective mirror element.

26. A real-image type viewfinder as set forth in claim 25, wherein said reflective mirror element comprises a roof mirror for converting the finder-image, formed by said positive objective optical system, into an erected finder-image, and said light-transmitting area is formed as a through hole in said roof mirror.

27. A real-image type viewfinder as set forth in claim 26, wherein the remaining reflective surfaces of said deflection optical system are provided by an optical prism system, which is optically associated with said roof mirror.

28. A real-image type viewfinder as set forth in claim 25, wherein the remaining reflective surfaces of said deflection optical system are provided by an optical prism system, which operates in conjunction with said reflective mirror element, thereby converting the finder-image, formed by said positive objective optical system, into an erected finder-image.

29. A real-image type viewfinder as set forth in claim 28, wherein said reflective mirror element comprises a half mirror.

30. A real-image type viewfinder as set forth in claim 28, wherein said reflective mirror element comprises an optical reflector, and said light-transmitting area is formed as a localized half mirror area.

31. A real-image type viewfinder as set forth in claim 28, wherein said reflective mirror element comprises an optical reflector, and said light-transmitting area is formed as a through hole.

32. A real-image type viewfinder as set forth in claim 25, wherein the projecting optical system of said optical information-pattern-projecting system has a magnification of at least 1.0.

33. A real-image type viewfinder as set forth in claim 25, wherein said optical information-pattern-projecting system includes a mask element, in which the information pattern is defined as an open area.

34. A real-image type viewfinder as set forth in claim 33, wherein said mask element is manufactured from an opaque plate.

35. A real-image type viewfinder as set forth in claim 33, wherein said mask element is manufactured from a translucent plate.

36. A real-image type viewfinder as set forth in claim 33, wherein said optical information-pattern-projecting system includes an optical diffusion plate, through which said mask element is illuminated by an internal light source.

37. A real-image type viewfinder as set forth in claim 33, wherein said optical information-pattern-projecting system includes an optical diffusion plate, through which said mask element is illuminated by external light.

38. A real-image type viewfinder as set forth in claim 37, wherein said optical diffusion plate is disposed in a front side of a camera body to define a window for introducing the external light into said optical information-pattern-projecting system.

39. A real-image type viewfinder as set forth in claim 37, wherein said optical diffusion plate is disposed in a top side of a camera body to define a window for introducing the external light into said optical information-pattern-projecting system.

40. A real-image type viewfinder as set forth in claim 33, wherein the mask element of said optical information-pattern-projecting system produces at least a pattern of a viewing-field-frame for defining a frame area to be photographed, and a pattern of a photometry-sensing-frame for defining a photometric area to be measured.

41. A real-image type viewfinder as set forth in claim 33, wherein another mask element, disposed adjacent to the image-forming plane defined by said positive objective optical system, produces a pattern of a viewing-field-frame for defining a frame area to be photographed, and the mask element of said optical information-pattern-projecting system produces at least a pattern of a photometry-sensing-frame for defining a photometric area to be measured.

42. A real-image type viewfinder as set forth in claim 25, wherein said optical information-pattern-projecting system includes a liquid crystal display panel, in which the information pattern is defined as a light-transmitting-area.

43. A real-image type viewfinder as set forth in claim 42, wherein said optical information-pattern-projecting system includes an optical diffusion plate, through which said liquid crystal display panel is illuminated by an internal light source.

44. A real-image type viewfinder as set forth in claim 42, wherein said optical information-pattern-projecting system has an optical diffusion plate, through which said liquid crystal display panel is illuminated by external light.

45. A real-image type viewfinder as set forth in claim 44, wherein said optical diffusion plate is disposed in a front side of a camera body to define a window for introducing the external light into said optical information-pattern-projecting system.

46. A real-image type viewfinder as set forth in claim 44, wherein said optical diffusion plate is disposed in a top side of a camera body to define a window for introducing the external light into said optical information-pattern-projecting system.

47. A real-image type viewfinder as set forth in claim 42, wherein the liquid crystal display panel of said optical information-pattern-projecting system produces at least a pattern of a viewing-field-frame for defining a frame area to be photographed, and a pattern of a photometry-sensing-frame for defining a photometric area to be measured.

48. A real-image type viewfinder as set forth in claim 42, wherein a mask element, disposed adjacent to the image-forming plane defined by said positive objective optical system, produces a pattern of a viewing-field-frame for defining a frame area to be photographed, and the liquid crystal display panel of said optical information-pattern-projecting system produces at least a pattern of a photometry-sensing-frame for defining a photometric area to be measured.

* * * * *